United States Patent
Tsuda

(10) Patent No.: US 9,884,532 B2
(45) Date of Patent: Feb. 6, 2018

(54) SUSPENSION CONTROL DEVICE FOR VEHICLE

(71) Applicant: TOYOTA JIDOSHA KABUSHIKI KAISHA, Toyota-shi, Aichi-ken (JP)

(72) Inventor: Taishi Tsuda, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/281,194

(22) Filed: Sep. 30, 2016

(65) Prior Publication Data

US 2017/0100980 A1    Apr. 13, 2017

(30) Foreign Application Priority Data

Oct. 7, 2015   (JP) .................. 2015-199605

(51) Int. Cl.
*B60G 17/0165* (2006.01)
*B60G 17/016* (2006.01)

(52) U.S. Cl.
CPC ..... *B60G 17/0165* (2013.01); *B60G 17/0161* (2013.01); *B60G 2400/10* (2013.01); *B60G 2400/204* (2013.01); *B60G 2400/252* (2013.01); *B60G 2400/82* (2013.01); *B60G 2500/20* (2013.01); *B60G 2500/30* (2013.01); *B60G 2600/182* (2013.01)

(58) Field of Classification Search
CPC ............ B60G 17/0161; B60G 17/0165; B60G 2400/82; B60G 2500/30; B60G 2600/182
USPC .......................................................... 701/37
See application file for complete search history.

(56) References Cited

U.S. PATENT DOCUMENTS

| | | | | |
|---|---|---|---|---|
| 4,749,210 A | * | 6/1988 | Sugasawa | B60G 17/0165 280/124.102 |
| 5,061,932 A | * | 10/1991 | Tribe | B60G 17/019 342/70 |
| 5,322,319 A | * | 6/1994 | Tanaka | B60G 17/0165 280/5.503 |
| 5,848,663 A | * | 12/1998 | Kuriki | B60G 17/0195 180/300 |
| 7,417,738 B2 | * | 8/2008 | Taylor | G01B 11/22 356/445 |

(Continued)

FOREIGN PATENT DOCUMENTS

| | | |
|---|---|---|
| JP | 4-100718 A | 4/1992 |
| JP | 4-342612 A | 11/1992 |

(Continued)

*Primary Examiner* — Tyler J Lee
(74) *Attorney, Agent, or Firm* — Sughrue Mion, PLLC

(57) ABSTRACT

A suspension control device includes an actuator configured to change an up/down stroke of a suspension, a front sensor, and a control device configured to estimate a displacement in a vertical direction of a road surface based on a detection result of the front sensor, thereby controlling the actuator. When the control device determines that a step portion in which a wheel comes into contact with two points of the road surface viewed in a direction along a rotational axis of the wheel exists ahead of a vehicle, the control device controls a force generated by the actuator so that, when the wheel comes into contact with the two points, the wheel rolls about the point without substantially pressing the point toward the travel direction of the vehicle.

7 Claims, 7 Drawing Sheets

(56) References Cited

U.S. PATENT DOCUMENTS

| | | | | |
|---|---|---|---|---|
| 2002/0162389 A1* | 11/2002 | Yokota | ................... | B60C 23/06 |
| | | | | 73/146 |
| 2008/0234900 A1* | 9/2008 | Bennett | .............. | B60G 17/0165 |
| | | | | 701/48 |
| 2013/0158799 A1* | 6/2013 | Kamimura | ......... | B60G 17/0165 |
| | | | | 701/40 |

FOREIGN PATENT DOCUMENTS

| | | |
|---|---|---|
| JP | 11-042918 A | 2/1999 |
| JP | 2012-140020 A | 7/2012 |
| WO | 2012/032655 A1 | 3/2012 |

* cited by examiner (A)

(B)

(C)

SUSPENSION CONTROL DEVICE FOR VEHICLE

CROSS-REFERENCE TO RELATED APPLICATIONS

The disclosure of Japanese Patent Application No. JP 2015-199605 filed on Oct. 7, 2015 is incorporated herein by reference in its entirety.

BACKGROUND

1. Technical Field

The present disclosure relates to a suspension control device for a vehicle, e.g., a motor vehicle.

2. Description of the Related Art

As a suspension of a vehicle, there is known a suspension including an actuator for controlling an up/down stroke of the suspension or a force applied to the suspension. As a control device for this type of the suspension, there is known a control device for predicting an undulation of a road surface ahead of the vehicle, estimating a displacement in a vertical direction of the road surface based on a result of the prediction, and controlling the actuator so that the up/down stroke of the suspension changes depending on the displacement in the vertical direction of the road surface.

For example, in Japanese Patent Application Laid-open No. Hei 4-342612, there is described a control device configured to estimate a relative displacement between a vehicle body and a road surface and an up/down acceleration of the vehicle body at a prediction position ahead of a front wheel by a prediction distance, and to output to an actuator a command value for an optimal force or stroke when the front wheel reaches the prediction position based on the estimations. With this type of the control device, for example, when the relative displacement between the vehicle body and the road surface and the up/down acceleration of the vehicle body are detected, and the actuator is controlled based on a result of the detection thereof, a delay in control can be decreased, thereby decreasing a force applied from the road surface to the vehicle body via the front wheel.

With the control device disclosed in Japanese Patent Application Laid-open No. Hei 4-342612, when the change in the up/down displacement of the road surface is continuous, and a change rate of the up/down displacement is not high, a position of the wheel in the up/down direction can be changed depending on the up/down displacement of the road surface, thereby effectively decreasing the force applied from the road surface to the vehicle body via the front wheel.

However, on a portion where the change in the up/down displacement of the road surface is discontinuous or a portion where the change rate of the up/down displacement of the road surface is high, such as a step that the vehicle needs to move over and pass, a change amount of the relative displacement between the vehicle body and the road surface and a change amount of the up/down acceleration of the vehicle body are high at the prediction position. Therefore, with the control device described in Japanese Patent Application Laid-open No. Hei 4-342612, the command value for the force or the stroke output to the actuator rapidly fluctuates, and the force applied from the road surface to the vehicle body via the front wheel cannot effectively be decreased.

When there exists roughness on the road surface, such as a step whose change in the up/down displacement is discontinuous and large, a state occurs where the wheel comes into contact with two portions of the road surface viewed in a direction along a rotational axis of the wheel, and a portion on a leading side in a travel direction of the vehicle out of the two portions is higher than the other portion. When the vehicle passes over this roughness, the actuator is controlled so that the command value for the force or the stroke output to the actuator does not rapidly fluctuate. For example, as illustrated in FIG. 12, when a wheel 200 comes into contact with a road surface 202 at two portions P1 and P2, the actuator is controlled so that the lowest point P0 of the wheel 200 moves along a target trajectory 204 connecting the two portions P1 and P2 of the road surface 202 with each other.

However, as indicated by the broken line of FIG. 12, when the lowest point P0 of the wheel 200 is between the two portions P1 and P2, the wheel 200 moves toward the travel direction of the vehicle while pressing the portion P2. Thus, the wheel 200 receives a reaction force Fr of a pressing force Fp from the portion P2, the reaction force Fr acts on the wheel 200, and this force is transmitted from the wheel 200 to the vehicle body, which is not shown in FIG. 12. Thus, the force applied from the road surface to the vehicle body via the wheel and a vibration of the vehicle body caused by this force cannot effectively be decreased.

SUMMARY

The present disclosure has a primary object to improve the control of the actuator configured to change the up/down stroke of the suspension, thereby decreasing the force applied from the road surface to the vehicle body via the wheel and the vibration of the vehicle body caused by the force when the wheel passes over roughness such as a step.

According to one embodiment of the present disclosure, there is provided a suspension control device for a vehicle, including: an actuator configured to change an up/down stroke of a suspension for suspending a wheel from a vehicle body; a prediction device configured to predict an undulation of a road surface ahead of the vehicle; and a control device configured to estimate a displacement in a vertical direction of the road surface based on a result of the prediction by the prediction device, and control the actuator so that the up/down stroke of the suspension changes depending on a displacement in a vertical direction of the road surface.

The control device is configured to, when roughness that generates a state where the wheel comes into contact with two portions of the road surface in a direction viewed along a rotational axis of the wheel, and in which a leading portion in the travel direction of the vehicle out of the two portions is higher than the other portion is determined to exist on the road surface ahead of the vehicle, control the up/down stroke of the suspension through the control of the actuator so that, when the wheel comes into contact with the two portions, the wheel rolls about the leading portion while maintaining a state of the contact with the leading portion without substantially pressing the leading portion toward the travel direction of the vehicle.

With the above-mentioned configuration, when the wheel comes into contact with the two portions, the wheel rolls about the leading portion while maintaining the state of the contact with the leading portion without substantially pressing the leading portion toward the travel direction of the vehicle. Thus, the reaction force of the pressing force of the wheel that presses the leading portion toward the travel direction of the vehicle is not substantially generated, and the wheel is not driven by the reaction force of the pressing force. Thus, when the wheel passes over roughness that generates the state where the wheel comes into contact with two portions of the road surface, the force applied from the road surface to the vehicle body via the wheel and the vibration of the vehicle body caused by the force can effectively be decreased.

In one aspect of the present disclosure, the control device is configured to set a target trajectory of a predetermined position of the wheel so that, when the wheel comes into contact with the two portions, the wheel rolls about the leading portion while maintaining the state of the contact with the leading portion without substantially pressing the leading portion toward the travel direction of the vehicle, and control the up/down stroke of the suspension so that the predetermined position moves along the target trajectory.

With the above-mentioned aspect, the target trajectory of the predetermined position of the wheel is set so that the wheel rolls about the leading portion while maintaining the state of the contact with the leading portion without substantially pressing the leading portion toward the travel direction of the vehicle. Then, the up/down stroke of the suspension is controlled so that the predetermined position moves along the target trajectory. Thus, compared with the case where the up/down stroke of the suspension is not controlled so that the predetermined position of the wheel moves along the target trajectory, the force applied from the road surface to the vehicle body via the wheel and the vibration of the vehicle body caused by the force can effectively be decreased.

In another aspect of the present disclosure, the control device is configured to set the target trajectory as a trajectory in a Cartesian coordinate system that has as an origin the predetermined position at a time point set in advance between a time point at which the roughness is determined to exist on the road surface ahead of the vehicle and a time point at which the wheel comes into contact with the two portions of the road surface, the travel direction of the vehicle as a time axis, and the vertical direction as an up/down displacement of the predetermined position.

With the above-mentioned aspect, the target trajectory is set as the trajectory in the Cartesian coordinate system that has as the origin the predetermined position at the time point set in advance between the time point at which the roughness is determined to exist on the road surface ahead of the vehicle and the time point at which the wheel comes into contact with the two portions of the road surface, the travel direction of the vehicle as the time axis, and the vertical direction as the up/down displacement of the predetermined position. Thus, the target trajectory of the predetermined position of the wheel can be set as the trajectory in the Cartesian coordinate system so that the wheel rolls about the leading portion while maintaining the state of the contact with the leading portion without substantially pressing the leading portion toward the travel direction of the vehicle.

Further, in another aspect of the present disclosure, the control device is configured to set the target trajectory based on a radius of the wheel, a difference in height between the two portions, a distance in the travel direction of the vehicle between the two portions, and a travel speed of the vehicle.

With the above-mentioned aspect, the target trajectory is set based on the radius of the wheel, the difference in height between the two portions, the distance in the travel direction of the vehicle between the two portions, and the travel speed of the vehicle. Thus, the target trajectory of the predetermined position of the wheel can accurately be set.

Further, in another aspect of the present disclosure, the control device is configured to estimate a displacement in the vertical direction of the road surface after each predetermined period, set, when a plurality of estimated displacements exist between the two portions, at least one intermediate target point on the target trajectory between the two portions, and correct the target trajectory so that the target trajectory is a straight line connecting a start point of the target trajectory and an intermediate target point closest to the start point with each other between the start point and the intermediate target point closest to the start point.

With the above-mentioned aspect, when a plurality of estimated displacements exist between the two portions, at least one intermediate target point is set on the target trajectory between the two portions, and the target trajectory is corrected so that the target trajectory is the straight line connecting the start point of the target trajectory and the intermediate target point closest to the start point with each other between the start point and the intermediate target point closest to the start point. Thus, compared with the case where the up/down stroke of the suspension is controlled so that the predetermined position of the wheel moves along the target trajectory over the entire range from the start point to the end point, the up/down stroke of the suspension can easily be controlled between the start point and the intermediate target point closest to the start point.

Further, in another aspect of the present disclosure, the control device is configured to estimate a displacement in the vertical direction of the road surface after each predetermined period, set, when a plurality of estimated displacements exist between the two portions, at least one intermediate target point on the target trajectory between the two portions, and correct the target trajectory so that the target trajectory is a straight line connecting an intermediate target point closest to an end point of the target trajectory and the end point of the target trajectory with each other between the intermediate target point closest to the end point and the end point.

With the above-mentioned aspect, when a plurality of estimated displacements exist between the two portions, at least one intermediate target point is set on the target trajectory between the two portions, and the target trajectory is corrected so that the target trajectory is the straight line connecting the intermediate target point closest to the end point of the target trajectory and the end point of the target trajectory with each other between the intermediate target point closest to the end point and the end point. Thus, compared with the case where the up/down stroke of the suspension is controlled so that the predetermined position of the wheel moves along the target trajectory over the entire range from the start point to the end point, the up/down stroke of the suspension can easily be controlled between the intermediate target point closest to the end point and the end point.

Further, in another aspect of the present disclosure, the control device is configured to set a plurality of intermediate target points, and correct the target trajectory so that the target trajectory is a straight line connecting two intermediate target points neighboring each other between the two intermediate target points neighboring each other.

With the above-mentioned aspect, a plurality of intermediate target points are set, and the target trajectory is corrected so that the target trajectory is a straight line connecting two intermediate target points neighboring each other between the two intermediate target points neighboring each other. Thus, compared with the case where the up/down stroke of the suspension is controlled so that the predetermined position of the wheel moves along the target trajectory over the entire range from the start point to the end point, the up/down stroke of the suspension can easily be controlled between the two intermediate target points.

DETAILED DESCRIPTION

Now, embodiments of the present disclosure are described in detail with reference to the accompanying drawings.

First Embodiment

Figure 1:
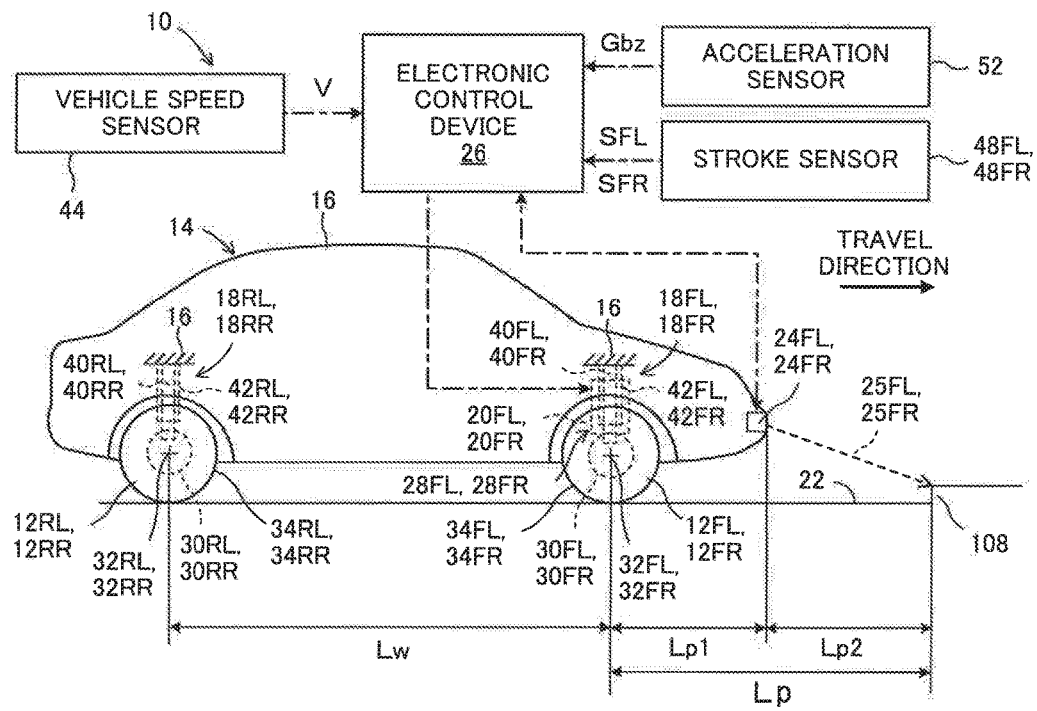
FIG. 1 is a side view for illustrating a suspension control device for a vehicle according to a first embodiment of the present disclosure.
Figure 2:
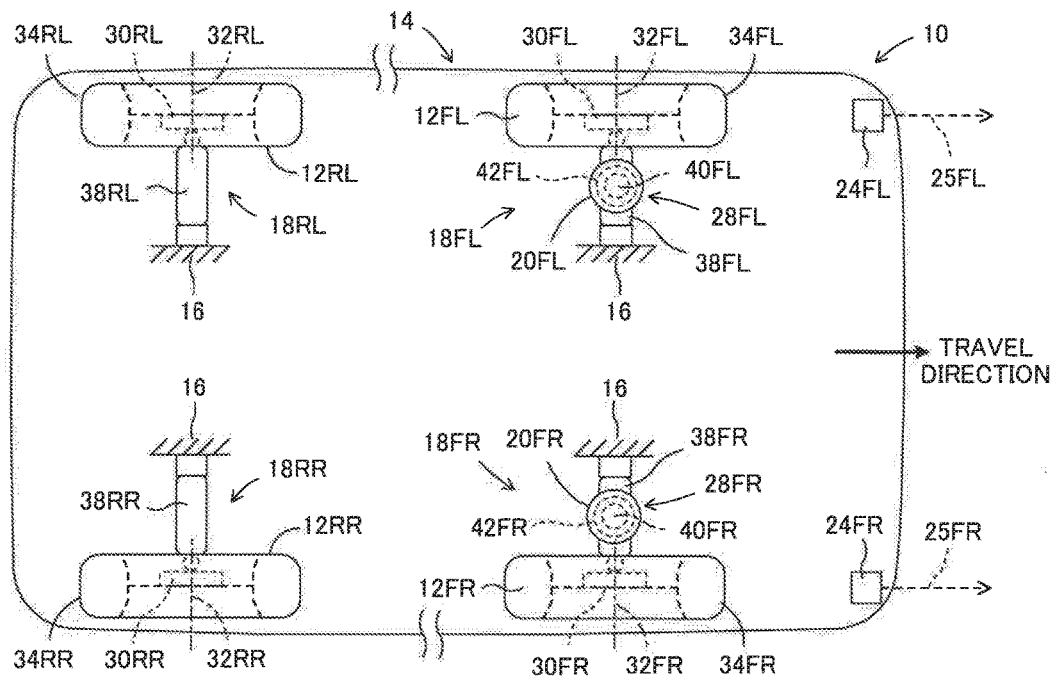
FIG. 2 is an enlarged plan view for illustrating the suspension control device for a vehicle according to the first embodiment of the present disclosure.

FIG. 1 and FIG. 2 are respectively a side view and a plan view for illustrating an overview of a suspension control device 10 for a vehicle according to a first embodiment of the present disclosure. As illustrated in those diagrams, the suspension control device 10 is applied to a vehicle 14 including front left and right wheels 12FL and 12FR, which are steered wheels, and rear left and right wheels 12RL and 12RR, which are non-steered wheels. The vehicle 14 includes front wheel suspensions 18FL and 18FR for respectively suspending the front wheels 12FL and 12FR from a vehicle body 16, and rear wheel suspensions 18RL and 18RR for respectively suspending the rear wheels 12RL and 12RR from the vehicle body 16.

In the following, when a plurality of wheels and members provided for a plurality of wheels are generally referred to, letters such as FL for identifying a specific wheel are omitted. For example, as a term for generally referring to the front wheels 12FL and 12FR and the like, wheels 12 are used.

The vehicle 14 may be any one of a front-wheel drive vehicle in which the front wheels 12FL and 12FR are drive wheels and the rear wheels 12RL and 12RR are driven wheels, a rear-wheel drive vehicle in which the front wheels 12FL and 12FR are driven wheels and the rear wheels 12RL and 12RR are drive wheels, and a four-wheel drive vehicle in which all the four wheels are drive wheels.

The suspension control device 10 includes actuators 20FL and 20FR, front sensors 24FL and 24FR as prediction devices for predicting undulations of a road surface 22 ahead of the vehicle 14, and an electronic control device 26, which is a control device for controlling the actuators 20FL and 20FR. The actuators 20FL and 20FR are respectively configured to control up/down strokes of the front wheel suspensions 18FL and 18FR, thereby changing distances in an up/down direction between the front wheels 12FL and 12FR and the vehicle body 16. The actuators 20FL and 20FR respectively cooperate with the front suspensions 18FL and 18FR, thereby forming active suspensions 28FL and 28FR.

Each of the active suspensions 28FL and 28FR may have an arbitrary structure as long as the structure can control the up/down stroke of the suspension, thereby changing the distance in the up/down direction between the wheel and the vehicle body. For example, as disclosed in Japanese Patent Application Laid-open No. Hei 4-100718, the active suspension may be configured to supply and discharge oil to and from a hydropneumatic cylinder. Alternatively, as described in Japanese Patent Application Laid-open No. 2012-140020, the active suspension may be configured to use an actuator to change the height of an attachment position of a suspension member such as a shock absorber to a vehicle-body-side member or a wheel-side member.

The front sensors 24FL and 24FR are respectively installed at front ends of the vehicle body 16 ahead of the front wheels 12FL and 12FR, and are configured to irradiate the road surface 22 with laser lights 25FL and 25FR, and detect reflected light from the road surface 22 ahead of the front wheels 12FL and 12FR, thereby detecting undulations of the road surface 22. The laser light is radiated so that a radiation point is reciprocally scanned in the left/right direction while being reciprocally scanned in the up/down direction.

The front sensors 24FL and 24FR may be sensors other than the sensors of the laser light type as long as the sensors can detect the undulations of the road surface ahead of the front wheels. The front sensor may be, for example, a stereo camera, a monocular camera, or a combination of the sensor of the laser light type and the stereo camera or the monocular camera. Further, in FIG. 1 and FIG. 2, the front sensors 24FL and 24FR are installed on a front bumper of the vehicle 14, but may be installed at arbitrary positions, e.g., a top edge portion on the inside of a front windshield, at which the undulations of the road surface ahead of the front wheels can be detected.

The electronic control device 26 is configured to estimate the displacements in the vertical direction of the road surface 22 based on the detection results of the undulations of the road surface 22 by the front sensors 24FL and 24FR. Further, the electronic control device 26 is configured to control the actuators 20FL and 20FR so that the up/down strokes of the front suspensions 18FL and 18FR change depending on the estimated displacements in the vertical direction of the road surface 22. For the operation of the front sensor, the estimation of the displacement in the vertical direction of the road surface, and the like, refer to, for example, International Patent WO2012/32655A as necessary.

The front wheels 12FL and 12FR are supported for rotation about rotational axes 32FL and 32FR by wheel support members 30FL and 30FR corresponding to the front wheels 12FL and 12FR, and are in contact with the road surface 22 through tires 34FL and 34FR. Similarly, the rear wheels 12RL and 12RR are supported for rotation about rotational axes 32RL and 32RR by wheel support members 3ORL and 3ORR corresponding to the rear wheels 12RL and 12RR, and are in contact with the road surface 22 through tires 34RL and 34RR.

The front suspensions 18FL and 18FR respectively include suspension arms 38FL and 38FR. The suspension arms 38FL and 38FR are respectively coupled for swing to the vehicle body 16 at inner ends by rubber bush devices, and are coupled for swing to the wheel support members 30FL and 30FR at outer ends by joints, e.g., ball joints. In FIG. 2, only one of the suspension arms 38FL or 38FR, one of the rubber bush devices, and one of the joints are illustrated, but a plurality of those members may be provided.

Similarly, the rear suspensions 18RL and 18RR respectively include suspension arms 38RL and 38RR. The suspension arms 38RL and 38RR are respectively coupled for swing to the vehicle body 16 at inner ends by rubber bush devices, and are coupled for swing to the wheel support members 30RL and 30RR at outer ends by joints, e.g., ball joints. In FIG. 2, only one of the suspension arms 38RL or 38RR, one of the rubber bush devices, and one of the joints are illustrated, but a plurality of those members may be provided.

Bottom ends of the shock absorbers 40FL and 40FR are respectively coupled to the suspension arms 38FL and 38FR or the wheel support members 20FL and 20FR. Top ends of the shock absorbers 40FL and 40FR are respectively coupled to the vehicle body 16. Suspension springs 42FL and 42FR are respectively interposed between the vehicle body 16 and the shock absorbers 40FL and 40FR, which are not illustrated in detail. The wheel support members 20FL and 20FR, the suspension arms 38FL and 38FR, the shock absorbers 40FL and 40FR, and the suspension springs 42FL and 42FR cooperate with one another to form the front wheel suspensions 18FL and 18FR. The front wheel suspensions 18FL and 18FR respectively permit the front wheels 12FL and 12FR to be displaced upward/downward with respect to the vehicle body 16.

Similarly, bottom ends of the shock absorbers 40RL and 40RR are respectively coupled to the suspension arms 38RL and 38RR or the wheel support members 20RL and 20RR. Top ends of the shock absorbers 40RL and 40RR are respectively coupled to the vehicle body 16. Suspension springs 42RL and 42RR are respectively interposed between the vehicle body 16 and the shock absorbers 40RL and 40RR, which are not illustrated in detail. The wheel support members 20RL and 20RR, the suspension arms 38RL and 38RR, the shock absorbers 40RL and 40RR, and the suspension springs 42RL and 42RR cooperate with one another to form the front wheel suspensions 18RL and 18RR. The front wheel suspensions 18RL and 18RR respectively permit the rear wheels 12RL and 12RR to be displaced upward/downward with respect to the vehicle body 16.

The suspensions 18FL to 18RR may be suspensions in any form as long as the suspensions permit the displacements in the up/down direction of the wheels 12FL to 12RR with respect to the vehicle body 16. The suspensions 18FL to 18RR are preferably suspensions of the independent suspension type such as the McPherson strut type, the double wishbone type, the multilink type, and the swing arm type. Moreover, the suspension springs 42FL to 42RR may be arbitrary springs such as compression coil springs or air springs.

Although not illustrated in detail in FIG. 1, the electronic control device 26 includes a microcomputer and a drive circuit. The microcomputer generally includes a CPU, a ROM, a RAM, and an input and output port device, those components being connected to one another via a bilateral common bus.

As illustrated in FIG. 1, the electronic control device 26 is configured to input signals representing the undulations of the road surface 22 from the front sensors 24FL and 24FR as well as a signal indicating a vehicle speed V from a vehicle speed sensor 44. Further, the electronic control device 26 is configured to input a signal indicating an up/down acceleration Gbz of the vehicle body 16 from an acceleration sensor 46, and signals representing up/down strokes SRL and SRR of the front suspensions 18RL and 18RR from stroke sensors 48FL and 48FR.

Figure 3:
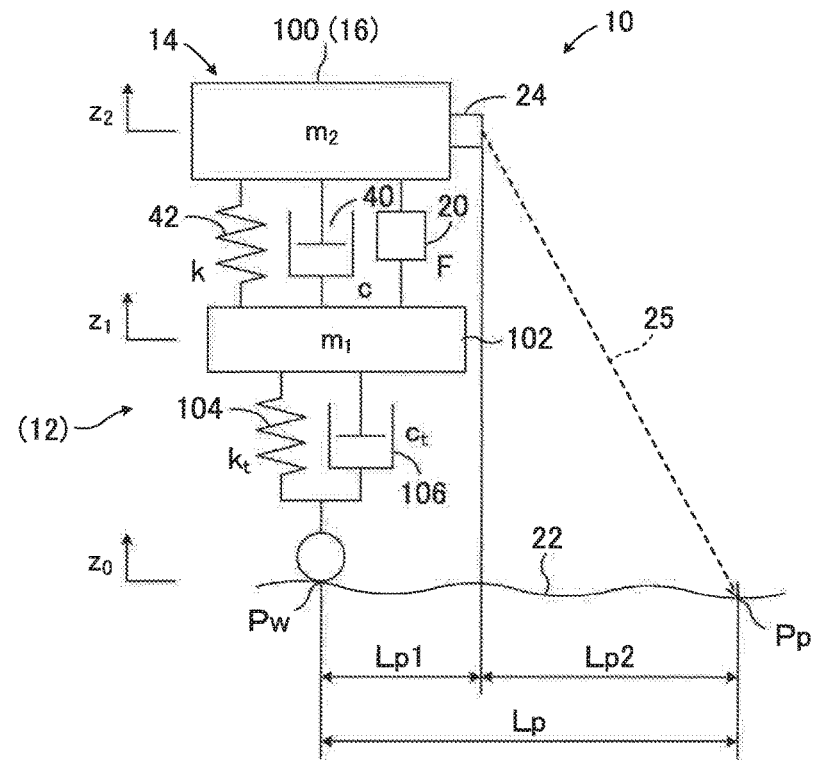
FIG. 3 is an explanatory diagram for illustrating a suspension control device according to the first embodiment for a single-wheel model of the vehicle.

FIG. 3 is an explanatory diagram for illustrating a suspension control device 10 according to the first embodiment for a single-wheel model of the vehicle 14.

In FIG. 3, reference numerals 100 and 102 respectively denote a sprung portion and an unsprung portion of the vehicle 14. Reference numeral 40 denotes a shock absorber corresponding to each of the shock absorbers 40FL and 40FR. Reference numeral 42 denotes a suspension spring corresponding to each of the suspension springs 42FL and 42FR. The sprung portion 100 includes portions on the side of the vehicle body (16) with respect to the suspension springs 42 out of members, e.g., the body (16) and the shock absorbers 40. The unsprung portion 102 includes portions on the side of the wheels (12) with respect to the suspension springs 42 out of members, e.g., the wheels (12) and the shock absorbers 40.

Further, in FIG. 3, reference numeral 20 denotes an actuator corresponding to the actuators 20FL and 20FR. Reference numeral 24 denotes a front sensor corresponding to the front sensors 24FL and 24FR. Reference numerals 104 and 106 respectively denote portions of the tire (34) of the wheel (12) functioning as a spring and a damper.

As illustrated in FIG. 3, the displacements of the road surface 22, the unsprung portion 102, and the sprung portion 100 are respectively denoted by $z_0$, $z_1$, and $z_2$, and masses of the unsprung portion 102 and the sprung portion 100 are respectively denoted by $m_1$ and $m_2$. The spring constant and the attenuation coefficient of the portions 104 and 106 functioning as the spring and the damper of the tire (34) are denoted by $k_t$ and $c_t$. The spring constant and the attenuation coefficient of the suspension spring 42 and the shock absorber 40 are respectively denoted by k and c. A force generated by the actuator 20 is denoted by F.

Further, derivatives of the displacements $z_0$, $z_1$, and $z_2$ are respectively denoted by $dz_0$, $dz_1$, and $dz_2$. Second derivatives of the displacements $z_1$ and $z_2$ are respectively denoted by $ddz_1$ and $ddz_2$. An upward direction of the displacements $z_0$, $z_1$, and $z_2$ is positive. An upward direction of the force generated by the suspension spring 42 and the like is positive. For motions of the up/down directions of the unsprung portion 102 and the sprung portion 100, equations of motion represented as Equations (1) and (2) are respectively satisfied.

$$m_2 * ddz_2 = k(z_1 - z_2) + c(dz_1 - dz_2) + F \quad (1)$$

$$m_1 * ddz_1 = -k(z_1 - z_2) - c(dz_1 - dz_2) - Fk_t(z_0 - z_1) + c_t(dz_0 - dz_1) \quad (2)$$

When an attenuation coefficient of vibration suppression control for the sprung portion 100 such as skyhook control is denoted by $c_{sh}$, a force F generated by the actuator 20 by the vibration suppression control is represented as Equation (3). Further, as illustrated in FIG. 3, a point at which the undulation of the road surface 22 is detected by the front sensor 24 is denoted by a prediction point Pp, a ground contact point of the wheel (12) is denoted by Pw, and a period required for the ground contact point Pw to move to the prediction point Pp is denoted by a prediction period $t_d$ of the front sensor 24. Then, the displacement $z_0$ is represented as Equation (4), which is a function u, based on the undulation of the road surface 22 detected by the front sensor 24.

$$F = -c_{sh} * dz_2 \quad (3)$$

$$z_0 = u(t_d) \quad (4)$$

As illustrated in FIG. 1 and FIG. 3, a distance in the vehicle longitudinal direction between the ground contact point Pw of the wheel (12) and the front sensor 24 is denoted by Lp1, a distance in the vehicle longitudinal direction between the front sensor 24 and the prediction point Pp is denoted by Lp2, and a sum of the distance Lp1 and the distance Lp2 is denoted by a prediction distance Lp for the wheel (12). When the vehicle 14 is traveling at the vehicle speed V, the prediction period $t_d$ is Lp/V. When the front sensor 24 is located behind the ground contact point Pw of the wheel (12), the prediction distance Lp is Lp1-Lp2.

A difference $z_1 - z_2$ in the displacement between the unsprung portion 102 and the sprung portion 100 in Equations (1) and (2) can be calculated based on detection values SRL and SRR of the stroke sensors 48FL and 48RR, and the second derivative $ddz_2$ can be detected by the acceleration sensor 52. The derivative $dz_2$ of the displacement $z_2$ can be calculated by integrating the up/down acceleration Gbz (= $ddz_2$) detected by the acceleration sensor 52, and the force F can thus be calculated in accordance with Equation (3). The displacement $z_0$ can be calculated in accordance with Equation (4).

Thus, the vibration of the sprung portion 100 can be suppressed by controlling the force F generated by the actuator 20 to be a value calculated in accordance with Equation (3). Thus, the control of this force F is carried out as normal vibration suppression control of suppressing the vibration of the vehicle body 16 while the vehicle 14 is traveling.

In contrast, the force F of causing the displacement $Z_0$ to be the value calculated by Equation (4) is determined from Equations (1) and (2), and a target value of the force generated by the actuator 20 is set to a target value Ft. The height of the lowest point P0 of the wheel (12) can be caused to reach a value of the displacement $z_0$ calculated in accordance with Equation (4) by controlling the actuator 20 so that the force F reaches the target value Ft, thereby controlling the stroke of the suspension 18. Thus, the control of the force F is carried out as trajectory control for the wheel of controlling the trajectory of the lowest point P0 as a predetermined position of the wheels 12FL and 12FR when the wheels 12FL and 12FR move over a step portion or the like of the road surface 22 as described later.

Figure 4:
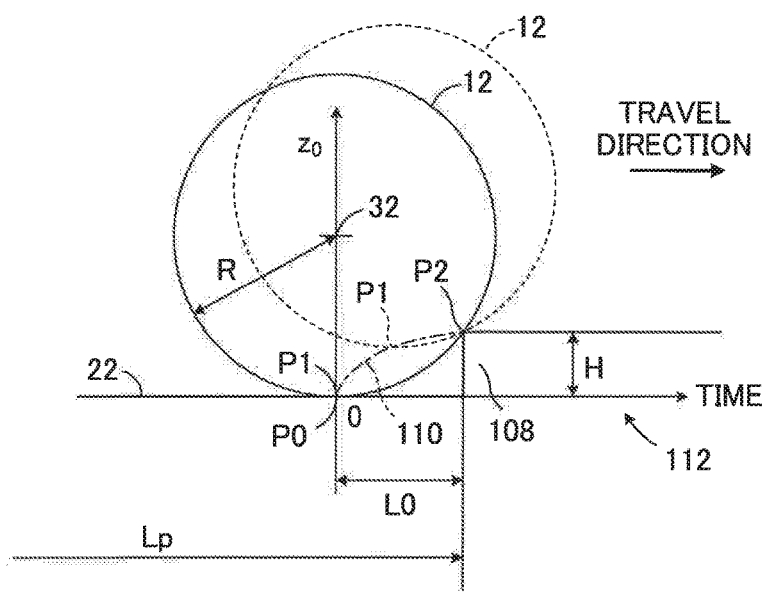
FIG. 4 is an explanatory diagram for illustrating a Cartesian coordinate system and a target trajectory of the lowest point of the wheel according to the first embodiment.

FIG. 4 is a diagram for illustrating a state where a step portion 108 exists on the road surface 22, and the wheel 12 moves over the step portion 108. Referring to FIG. 4, a description is now given of a target trajectory 110 of the lowest point P0 as the predetermined position of the wheel 12.

In FIG. 4, as the wheel 12 is represented as the solid line, the step portion 108 is roughness that generates a state where the wheel 12 comes into contact with two portions of the road surface 22 viewed in a direction along the rotational axis 32 of the wheel 12. The two portions are a point P1, which is the lowest point P0 of the wheel 12, and a point P2 on a leading side in the travel direction of the vehicle 14. The point P2 is a corner of the step portion 108, and is located higher than the point P1.

The radius of the wheel 12 is denoted by R, and the height of the step portion 108 is denoted by H. When the wheel 12 reaches the step portion 108 and comes into contact with the two points P1 and P2 of the road surface 22, a distance L0 in the travel direction of the vehicle 14 between the point P1 and the point P2 is represented as Equation (5).

$$L0 = \{R^2 - (R - H)^2\}^{1/2} \quad (5)$$

In FIG. 4, a long dashed short dashed line indicates a target trajectory 110 of the lowest point P0, which is the predetermined position of the wheel 12. The target trajectory 110 is a target trajectory for moving the wheel 12 so that, when the wheel 12 comes into contact with the points P1 and P2, the wheels 12 roll about the point P2 as the broken line indicates while maintaining the state of the contact with the point P2 without substantially pressing the point P2 on the leading side toward the travel direction of the vehicle.

As illustrated in FIG. 4, the electronic control device 26 is configured to set a Cartesian coordinate system 112 that has the point P1, which is the position of the lowest point P0 when the wheel 12 comes into contact with the road surface 22 at the two portions, which are the points P1 and P2, as the origin, the travel direction of the vehicle as a time axis, and the vertical direction as the up/down displacement $z_0$ of the lowest point P0. In other words, the electronic control device 26 is configured to set the Cartesian coordinate system 112 at a position displaced ahead by Lp−L0 from the contact point of the wheels 12FL and 12FR at the time point when predetermined roughness where the wheels 12FL and 12FR come into contact with the road surface 22 at the points P1 and P2 is determined to exist.

According to the first embodiment, the target trajectory 110 is set for the lowest point P0 to move from the point P1 to the point P2 in the Cartesian coordinate system 112. Based on a position relationship among the points P1 and P2 and the lowest point P0 illustrated in FIG. 4, when a target position of the lowest point P0 is denoted by $z_{0t}$, the target trajectory 110 presents a parabola represented as Equation (6). When the lowest point P0 moves along the target trajectory 110 from the start point P1 to the end point P2, the wheels 12FL and 12FR roll about the point P2 while maintaining the state of the contact with the point P2 without substantially pressing the point P2 on the leading side toward the travel direction of the vehicle.

$$z_{0t} = \Delta z_0 + H - [R - \{R^2 - (L0^2 - V*t)^2\}^{1/2}] \quad (6)$$

In Equation (6), $\Delta z_0$ is a difference ($\Delta z_{op1} - \Delta z_{os}$) between a displacement ($\Delta z_{op1}$) of the road surface 22 at the point P1 and a displacement ($\Delta z_{os}$) of the road surface 22 at the time point when the predetermined roughness is determined to exist. When the prediction distance Lp is short, the difference $\Delta z_0$ in the displacement of the road surface 22 may be omitted.

Figure 5:
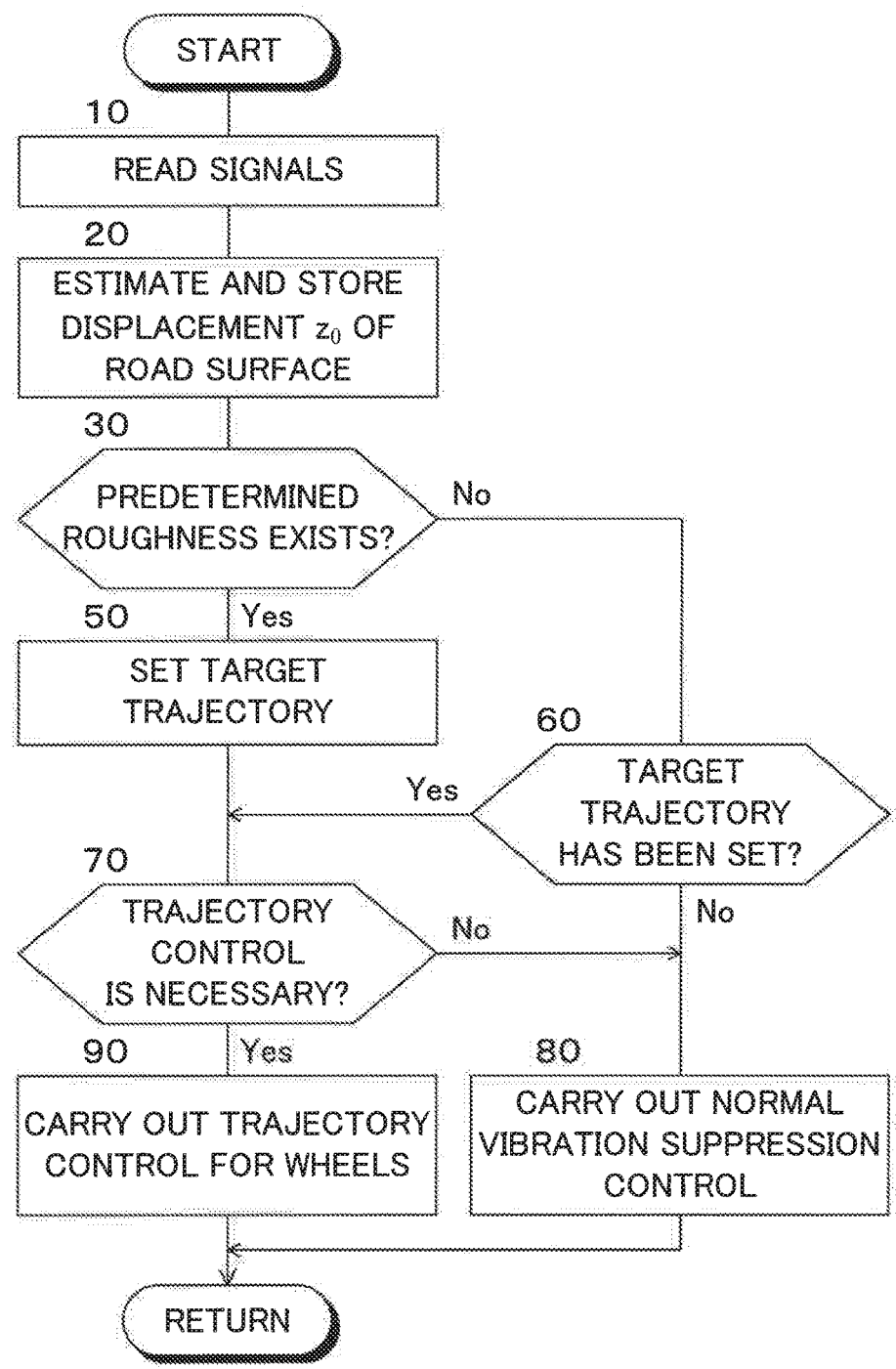
FIG. 5 is a flowchart for illustrating a suspension control routine according to the first embodiment.

The electronic control device 26 is configured to estimate the displacement $z_0$ in the vertical direction of the road surface 22 based on the detection result of each of the front sensors 24FL and 24FR, and separately control each of the actuators 20FL and 20FR so that the lowest point P0 of each of the wheels 12FL and 12FR changes depending on the displacement in the vertical direction of the road surface 22 in accordance with the flowchart illustrated in FIG. 5. In particular, the electronic control device 26 is configured to carry out the trajectory control for the wheels when the electronic control device 26 determines that the predetermined roughness generating the state where each of the wheels 12FL and 12FR comes into contact with the road surface 22 at the points P1 and P2 as described above exists on a road surface ahead of the vehicle. In other words, the electronic control device 26 is configured to control each of the actuators 20FL and 20FR so that the lowest point P0 moves along the target trajectory 110, thereby controlling the stroke of each of the suspensions 18FL and 18FR.

In contrast, the electronic control device 26 is configured to, when the predetermined roughness is determined not to exist on the road surface 22 ahead of the vehicle, carry out the normal vibration suppression control that controls the actuators 20FL and 20FR so that the force F reaches the value calculated in accordance with Equation (3), thereby suppressing the vibration of the vehicle body 16.

<Actuator Control Routine>

Next, a description is given of an actuator control routine in the first embodiment with reference to the flowchart illustrated in FIG. 5. Control in accordance with the flowchart illustrated in FIG. 5 is repeatedly executed at predetermined time periods (cycle times) for each individual actuator 20FL and 20FR when an ignition switch (not shown) is on. In the following description, control of the actuators in accordance with the flowchart illustrated in FIG. 5 is simply referred to as "control".

First, in Step 10, a signal representing the undulation of the road surface 22 input from each of the front sensors 24FL and 24FR and the like are read.

In Step 20, based on the undulation of the road surface 22 detected by each of the front sensors 24FL and 24FR, the displacement $z_0$ of the prediction point Pp of the road surface 22 is estimated. Then, a time series of the displacement $z_0$ associated with the period Lp/V until the ground contact point Pw of each of the wheels 12FL and 12FR reaches the prediction point Pp is stored in a RAM, and data on the displacement $z_0$ behind the vehicle with respect to the ground contact point Pw is deleted. The estimation, the storage, and the deletion of the displacements $z_0$ are carried out after each cycle time, thereby enabling the electronic control device 26 to identify the displacement $z_0$ of the road surface 22 at an arbitrary position between the ground contact point Pw and the prediction point Pp.

In Step 30, it is determined whether or not the predetermined roughness generating the state where each of the wheels 12FL and 12FR is in contact with the two portions of the road surface 22 viewed in the direction along each of the rotational axes 32FL and 32FR of each of the wheels 12FL and 12FR exists at the prediction point Pp of the road surface 22. When a negative determination is made, the control proceeds to Step 60, and when an affirmative determination is made, the control proceeds to Step 50. When the same roughness that has already been determined to exist is again determined to exist, the determination in Step 30 is the negative determination.

In Step 50, the target trajectory 110 represented by Equation (6) is set by setting the Cartesian coordinate system 112 in the above-mentioned manner, and estimating the height H of a step portion or the like and the distance L0 in the travel direction of the vehicle 14 between the points P1 and P2.

In Step 60, it is determined whether or not the target trajectory 110 has been set. When a negative determination is made, the control proceeds to Step 80, and when an affirmative determination is made, the control proceeds to Step 70.

In Step 70, it is determined whether or not the trajectory control for the wheel based on the target trajectory 110 needs to be carried out through, for example, determination of whether or not the lowest point P0 of each of the wheels 12FL and 12FR exists between the points P1 and P2. When a negative determination is made, the control proceeds to Step 80, and when an affirmative determination is made, the control proceeds to Step 90.

In Step 80, each of the actuators 20FL and 20FR is controlled so that the force F reaches the value calculated in accordance with Equation (3), thereby carrying out the normal vibration suppression control of suppressing the vibration of the vehicle body 16.

In Step 90, the force F generated by each of the actuators 20FL and 20FR is controlled so that the lowest point P0 of each of the wheels 12FL and 12FR moves along the target trajectory 110, thereby controlling the stroke of each of the suspensions 18FL and 18FR, resulting in the execution of the trajectory control of the wheel.

<Operation of Suspension Control Device 10>

(1) Case where Predetermined Roughness Exists

When the predetermined roughness is determined to exist, in Step 30, an affirmative determination is made, and in Step 50, the target trajectory 110 is set. Then, when the lowest point P0 of each of the wheels 12FL and 12FR has not reached the point P1, in Step 30, a negative determination is made, in Step 60, an affirmative determination is made, and, in Step 70, a negative determination is made. As a result, as described above, in Step 80, the normal vibration suppression control is carried out, and the vibration of the vehicle body 16 is suppressed without carrying out the trajectory control for the wheels.

When the lowest point P0 of each of the wheels 12FL and 12FR reaches the point P1, in Step 30, the negative determination is made, and, in Step 60, the affirmative determination is made, but, in Step 70, an affirmative determination is made, and in Step 90, the trajectory control for the wheels is carried out. The affirmative determination in Step 70 and the execution of the trajectory control for the wheels in Step 90 are repeated until the lowest point P0 of each of the wheels 12FL and 12FR reaches the point P2.

The target trajectory 110 is such a target trajectory of the lowest point P0 that when each of the wheels 12FL and 12FR comes into contact with the points P1 and P2, the wheels roll about the point P2 while maintaining the state of the contact with the point P2 without substantially pressing the point P2 toward the travel direction of the vehicle. Thus, when each of the wheels 12FL and 12FR comes into contact with the points P1 and P2, the wheels roll about the point P2 while maintaining the state of the contact with the point P2 without substantially pressing the point P2 toward the travel direction of the vehicle. Thus, according to the first embodiment, a reaction force of the pressing force by each of the wheels 12FL and 12FR pressing the point P2 toward the travel direction of the vehicle is not generated, and a force applied to the vehicle body 16 from the road surface 22 via each of the wheels 12FL and 12FR, and a vibration of the vehicle body caused by this force can effectively be decreased.

Moreover, according to the first embodiment, the target trajectory 110 is set as the trajectory in the Cartesian coordinate system 112 that has the lowest point P0 of the wheel when each of the wheels 12FL and 12FR comes into contact with the two points P1 and P2 of the road surface as the origin, the travel direction of the vehicle 14 as the time axis, and the vertical direction as the up/down displacement of the lowest point P0. Thus, the target trajectory of the lowest point P0 of each of the wheels 12FL and 12FR can be set so that the wheels roll about the point P2 while maintaining the state of the contact with the point P2 without substantially pressing the point P2 toward the travel direction of the vehicle 14.

Further, according to the first embodiment, the target trajectory 110 is set based on the radius R of the wheels 12FL and 12FR, the difference H in the height between the two points P1 and P2, the distance L0 in the travel direction of the vehicle between the two points P1 and P2, and the vehicle speed V. Thus, the target trajectory of the lowest point P0 of each of the wheels 12FL and 12FR can accurately be set.

(2) Case where Predetermined Roughness does not Exist

When the predetermined roughness is determined not to exist, in Steps 30 and 60, a negative determination is made, and in Step 80, the normal vibration suppression control is carried out. As a result, the vibration of the vehicle body 16 is suppressed without carrying out the trajectory control for the wheels. Thus, the vibration of the vehicle body 16 during normal travel of the vehicle 14 can be decreased.

First Modified Example

Figure 6:
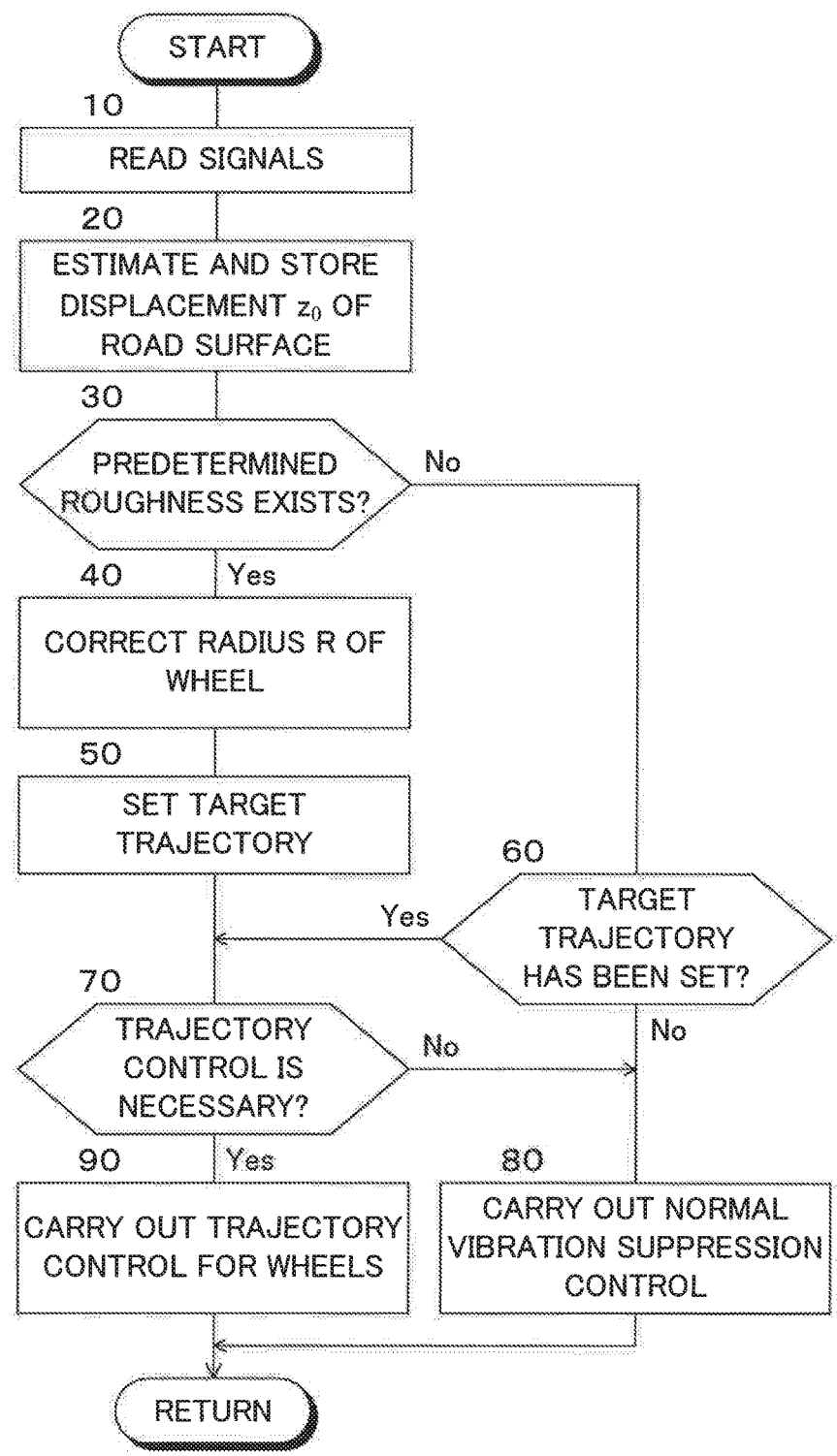
FIG. 6 is a flowchart for illustrating a suspension control routine according to a first modified example of the present disclosure.

FIG. 6 is a flowchart for illustrating a control routine for the actuator in the suspension control device 10 for a vehicle according to a first modified example of the present disclosure. In FIG. 6, the same steps as the steps illustrated in FIG. 5 are denoted by the same step numbers as that assigned in FIG. 5.

As appreciated from a comparison between FIG. 6 and FIG. 5, Steps 10 to 30 and Steps 60 to 90 are carried out as in the first embodiment. When the affirmative determination is made in Step 30, Step 40 is carried out before Step 50, resulting in a correction of the radius R of the wheel 12.

According to the first modified example, signals indicating air pressures PtFL and PtFR of the tires 34FL and 34FR of the wheels 12FL and 12FR detected by tire air pressure sensors, not shown in FIG. 1, are input to the electronic control device 26. Moreover, signals indicating wheel speeds VwFL and VwFR of the wheels 12FL and 12FR detected by wheel speed sensors, not shown in FIG. 1, are input to the electronic control device 26.

In Step 40, a corrected radius Ra of the wheel 12 is calculated in accordance with Equation (7). In Equation (7), $R_0$ and $Pt_0$ are respectively a standard radius of the wheel 12 and a standard air pressure of the tires 34FL and 34FR, and α is a coefficient for converting a change amount $Pt-Pt_0$ of the tire air pressure with respect to the standard air pressure to a change amount of the radius of the wheel 12. $Vw_0$ is a value (standard wheel speed) acquired by converting the vehicle speed V to a wheel speed, and β is a coefficient for converting a change amount $Vw-Vw_0$ of the wheel speed with respect to the standard wheel speed to a change amount of the radius of the wheel 12. Further, dVw is a derivative (wheel acceleration) of the wheel speed Vw, and γ is a coefficient for converting the wheel acceleration dVw to a change amount of the radius of the wheel 12. The coefficients α, β, and γ may be values acquired by experiments or the like in advance.

$$Ra=R_0+\alpha(Pt-Pt_0)+\beta(Vw-Vw_0)+\gamma^* dVw \quad (7)$$

In Step 50, the target trajectory 110 for moving the lowest point P0 from the point P1 to the point P2 in the Cartesian coordinate system 112 is set to a trajectory represented by Equation (8) corresponding to Equation (6) according to the first embodiment.

$$z_{0t}=\Delta z_0+H-[Ra-\{Ra^2-(L0^2-V\cdot t)^2\}]^{1/2} \quad (8)$$

According to the first modified example, the radius R of the wheel 12 is corrected based on the change amount $Pt-Pt_0$ of the tire air pressure, the change amount $Vw-Vw_0$ of the wheel speed, and the wheel acceleration dVw. Thus, the target trajectory 110 can accurately be set based on the corrected radius Ra of the wheel 12 corresponding to the actual radius of the wheel 12 independently of any of the tire air pressure, the wheel speed, and the wheel acceleration dVw.

According to the first modified example, the radius R of the wheel 12 is corrected based on the change amount $Pt-Pt_0$ of the tire air pressure, the change amount $Vw-Vw_0$ of the wheel speed, and the wheel acceleration dVw, but at least one of the second to fourth terms of Equation (7) may be omitted.

Second Modified Example

Figure 7:
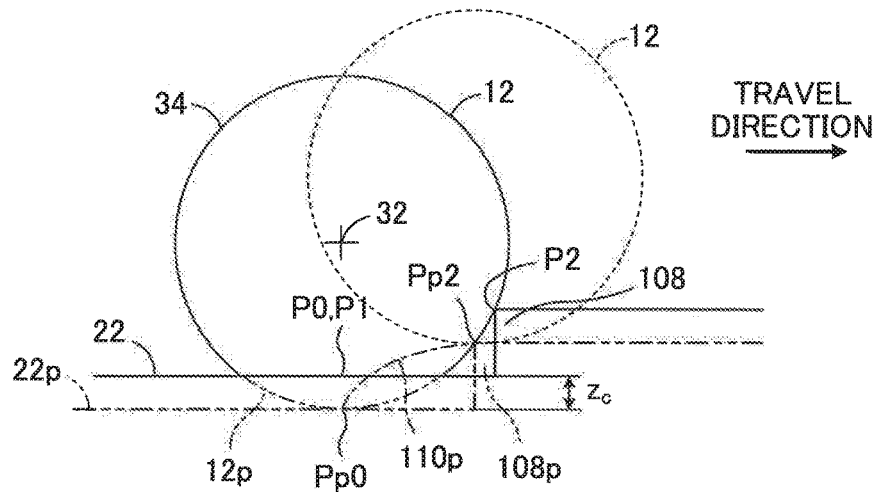
FIG. 7 is an explanatory diagram for illustrating the target trajectory of the lowest point of the wheel according to a second modified example of the present disclosure.

FIG. 7 is a diagram for illustrating the movement of the wheel 12 when the air pressure Pt of the tire 34 of the wheel 12 is low, and the tire 34 is thus in contact with the road surface 22 in a contact region having a relatively wide area, and is contact with the step portion 108. The lowest point P0 and the point P1 are points directly below the rotational axis 32 of the wheel 12 out of the contact region of the tire 34 viewed in a lateral direction of the vehicle.

In FIG. 7, a virtual line represents a virtual wheel 12p when the rotational axis 32 is at the same position as that of the rotational axis 32 of the wheel 12 represented as the solid line, and the air pressure Pt of the tire 34 is the standard air pressure $Pt_0$. The lowest point P0 of the virtual wheel 12p is denoted by a virtual lowest point Pp0, and a distance in the vertical direction between the lowest point P0 and the virtual lowest point Pp0 is denoted by $z_c$. A point of the corner of a step portion 108p on a virtual road surface 22p lower by the distance $z_c$ than the road surface 22 is denoted by a virtual point Pp2. The distance $z_c$ decreases as the wheel 12 moves from the position represented as the solid line of FIG. 7 toward the travel direction of the vehicle, and becomes 0 when the lowest point P0 leaves the road surface 22 on the vehicle rear side with respect to the step portion 108p.

As appreciated from FIG. 7, when the wheel 12 is moved so that the wheel 12 rolls about the virtual point Pp2 without substantially pressing the virtual point Pp2, the wheel 12 rolls about the point P2 without substantially pressing the point P2. Thus, according to the second modified example, as the target trajectory for moving the virtual lowest point Pp0 from the virtual point Pp1 to the virtual point Pp2, a target trajectory 110p is set. When a displacement of the virtual lowest point Pp0 is denoted by $zp_{0t}$, the target trajectory 110p is represented as Equation (9).

$$zp_{0t}=\Delta z_0+H-[R-\{R^2-(L0^2-V\cdot t)^2\}]^{1/2}-z_c \quad (9)$$

According to the second modified example, the trajectory control for the wheel is carried out by, in Step 50, setting the target trajectory 110p represented as Equation (9), and, in Step 90, controlling each of the actuators 20FL and 20FR so that the lowest point Pp0 of each of the wheels 12FL and 12FR moves along the target trajectory 110p. Steps other than Steps 50 and 90 are carried out in the same manner as in the case of the first embodiment.

According to the second modified example, even when the air pressure Pt of each of the tires 34FL and 34FR of the wheels 12FL and 12FR is low, and the tire is in contact with the road surface 22 in a contact region having a relatively wide area, the target trajectory 110p of moving each of the wheels 12FL and 12FR so that the wheels roll about the virtual point Pp2 without pressing the virtual point Pp2 can be set. Thus, even when the air pressure Pt of each of the tires 34FL and 34FR of the wheels 12FL and 12FR is low, each of the wheels 12FL and 12FR can be moved so that each of the wheels 12FL and 12FR rolls about the point P2 without substantially pressing the point Pp2.

Also according to the second modified example, the radius R of the wheel 12 may be corrected based on the change amount $Vw-Vw_0$ of the wheel speed and the wheel acceleration $dVw$. In this case, a corrected radius Rb of the wheel 12 is calculated in accordance with Equation (10), and the target trajectory 110p represented by Equation (11) is set. The second or third term of Equation (10) may be omitted.

$$Rb = R_0 + \beta(Vw - Vw_0) + \gamma^* dVw \tag{10}$$

$$zp_{0t} = \Delta z_0 + H - [Rb - \{Rb^2 - (L0^2 - V \cdot t)^2\}]^{1/2} \tag{11}$$

Second Embodiment

Figure 8:
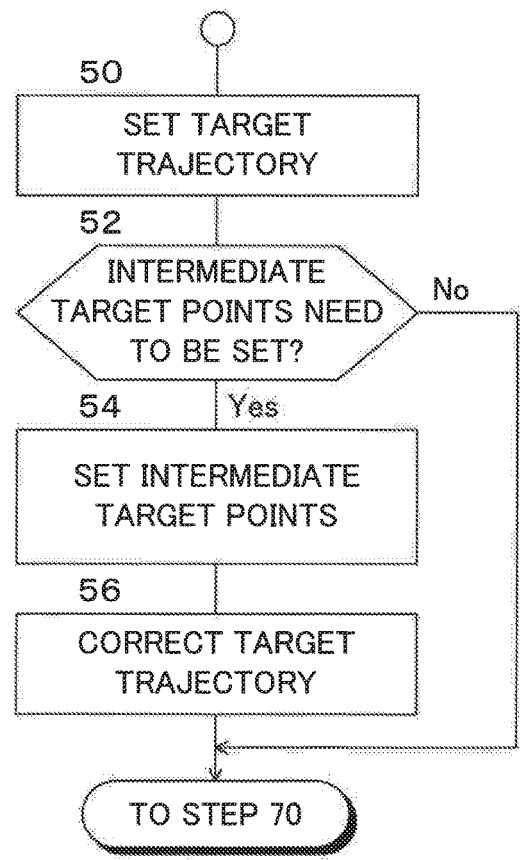
FIG. 8 is a flowchart for illustrating a subroutine of setting and correcting the target trajectory in the suspension control routine in the suspension control device for a vehicle according to a second embodiment of the present disclosure.

FIG. 8 is a flowchart for illustrating a subroutine for setting and correcting a target trajectory in a control routine for the actuator in the suspension control device 10 for a vehicle according to a second embodiment of the present disclosure.

According to the second embodiment, when, in Step 50, the target trajectory 110 is set, the target trajectory is corrected by the execution of Steps 52 to 56. Moreover, in Step 90, the trajectory control for the wheels is carried out by controlling the force F generated by each of the actuators 20FL and 20FR so that the lowest point P0 of each of the wheels 12FL and 12FR moves along the corrected target trajectory. Steps other than Step 90 are carried out in the same manner as in the case of the first embodiment.

In Step 52, for example, whether or not an intermediate target point needs to be set between the points P1 and P2 is determined by determining whether or not the number N of the points, each for which the displacement $z_0$ of the road surface between the points P1 and P2 is estimated, is equal to or more than a reference value N0 (positive integer). The reference value N0 may be a constant positive integer, but the number N of points decreases as the vehicle speed V increases. Therefore, the reference value N0 may be variably set depending on the vehicle speed V so as to decrease as the vehicle speed V increases.

Figure 9:
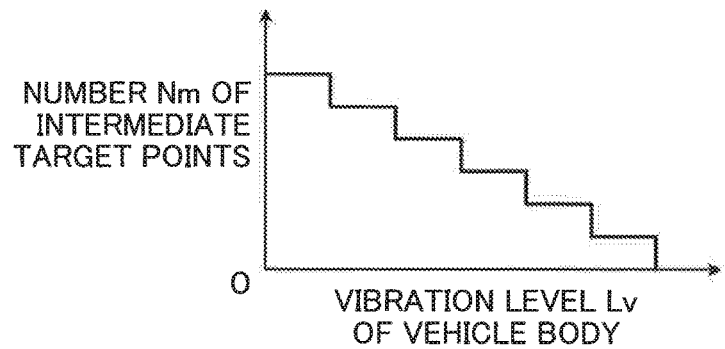
FIG. 9 is a map for calculating the number Nm of intermediate target points to be set based on a vibration level Lv of a vehicle body.

In Step 54, a vibration level Lv of the vehicle body 16 is estimated based on the up/down acceleration Gbz of the vehicle body 16 detected by the acceleration sensor 52, and the number Nm (positive integer) of the intermediate target points to be set is determined by referring to a map shown in FIG. 9 based on the vibration level Lv. Further, Nm of the target intermediate points Pm are separated from each other, and are then set on the target trajectory 110. In this case, the intermediate target point Pm is set to a position closer to the point P1 by an amount corresponding to one or two points, each for which the displacement $z_0$ of the road surface is estimated, from a point acquired by equally dividing the distance L0 between the points P1 and P2 in the travel direction of the vehicle by Nm+1.

In Step 56, the target trajectory 110 is corrected so as to be a straight line connecting the start point P1 of the target trajectory and the intermediate target point Pm closest to the start point to each other between the start point P1 and the intermediate target point Pm closest to the start point P1. Moreover, the target trajectory 110 is corrected so as to be a straight line connecting the intermediate target point Pm closest to the end point P2 of the target trajectory and the end point P2 of the target trajectory to each other between the intermediate target point Pm closest to the end point P2 of the target trajectory and the end point P2 of the target trajectory. Further, when a plurality of intermediate target points are set, the target trajectory is corrected between two intermediate target points neighboring each other so as to be a straight line connecting the two intermediate target points, which neighbor each other, with each other.

Figure 10:
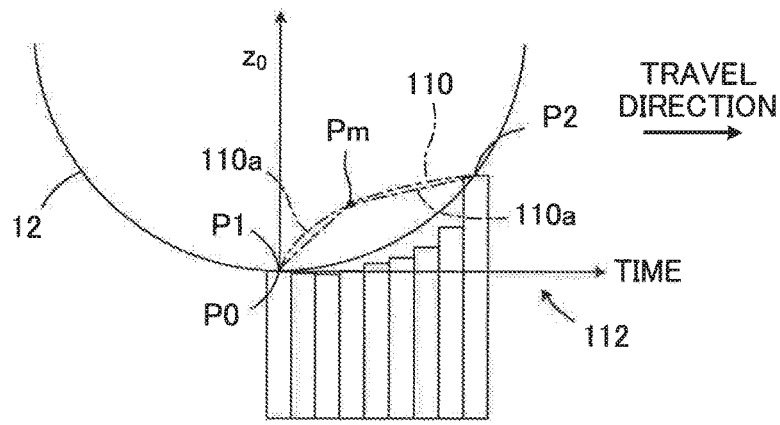
FIG. 10 is an explanatory diagram for illustrating, for a case where the number Nm of the intermediate points to be set is one, an example of the one intermediate target point Pm and a corrected straight line target trajectory.
Figure 11:
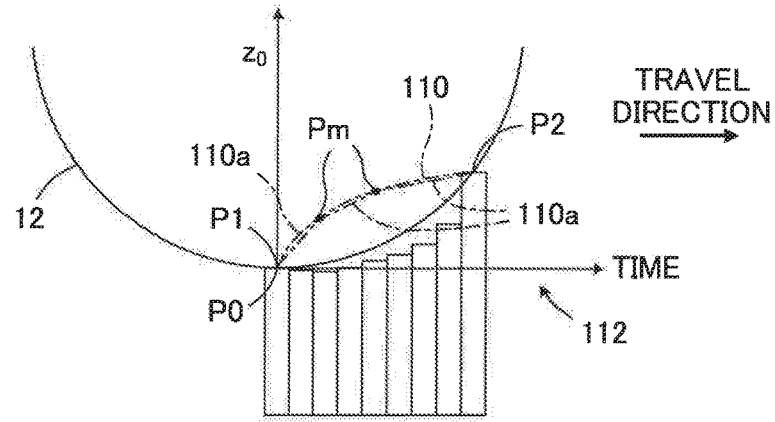
FIG. 11 is an explanatory diagram for illustrating, for a case where the number Nm of the intermediate points to be set is two, an example of the two intermediate target points Pm and a corrected straight line target trajectory.
Figure 12:
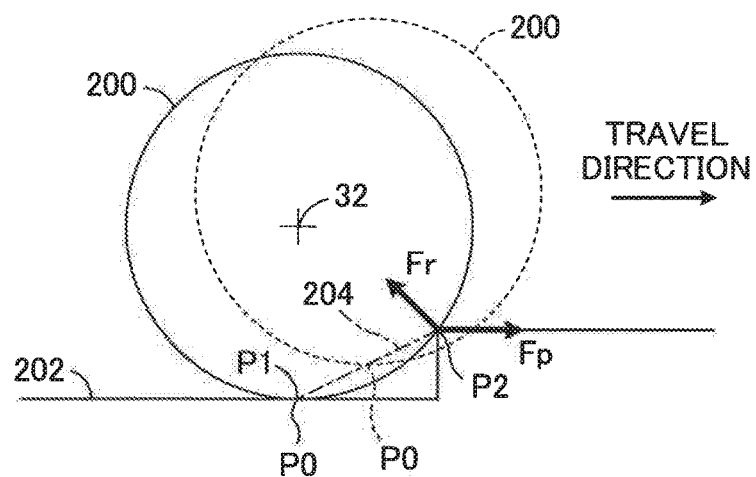
FIG. 12 is an explanatory diagram for illustrating the target trajectory of the lowest point of the wheel in a related-art suspension control device.

For example, FIG. 10 shows such an example that the number Nm is one, and one intermediate target point Pm is set, and FIG. 11 shows such an example that the number Nm is two, and two intermediate target points Pm are set. In FIG. 10 and FIG. 11, the corrected target trajectory is denoted by 110a. In FIG. 10 and FIG. 11, a vertically long rectangle represents the displacement $z_0$ of the road surface 22 estimated after each cycle time with respect to the displacement $z_0$ of the road surface 22 at the origin of the Cartesian space 112 as a reference. Thus, a horizontal width of each of the rectangles represents the cycle time.

According to the second embodiment, such control that the lowest point P0 of each of the wheels 12FL and 12FR moves along the corrected target trajectory 110a that is the straight line only needs to be carried out. Thus, compared with the above-described first embodiment in which the lowest point P0 of each of the wheels 12FL and 12FR is controlled so as to move along the parabolic target trajectory 110, the control for the actuators 20FL and 20FR can be simplified, thereby easily controlling the movement of the lowest point P0.

As described above, the target trajectory 110 is a parabola, and an up/down displacement per unit time thus increases as the position approaches the start point P1 of the target trajectory. Thus, when the lowest point P0 of the wheel 12 is controlled so as to move along the corrected target trajectory 110a, the intermediate target point Pm is preferably set to a position closer to the start point P1 of the target trajectory than the point acquired as a result of equally dividing the distance L0 by Nm+1 in order to decrease the force of the wheel 12 pressing the end point P2 as much as possible.

In particular, according to the second embodiment, the intermediate target point Pm is set to the position closer to the point P1 by the amount corresponding to one or two points, each for which the displacement $z_0$ of the road surface is estimated, from the point acquired by equally dividing the distance L0 between the points P1 and P2 in the travel direction of the vehicle by Nm+1. Thus, compared with the case where the intermediate target point Pm is set to the point acquired by equally dividing the distance L0 by Nm+1, the force of the wheel 12 pressing the end point P2 can be decreased when the lowest point P0 of the wheel 12 is controlled to move along the corrected target trajectory 110a. Thus, such a fear that the wheel 12 is pressed upward by the reaction force of the force of the wheel 12 pressing the end point P2 can be decreased, and the vibration of the vehicle body 16 can be decreased when the wheel 12 moves over the predetermined roughness.

In the state illustrated in FIG. 10, the correction of the target trajectory 110 may be omitted on the leading side or the trailing side in the travel direction of the vehicle for the intermediate target point Pm. Similarly, in the state illustrated in FIG. 11, the correction of the target trajectory 110 may be omitted in at least one of the interval between the start point P1 and an intermediate target point Pm closer to the start point P1, the interval between two intermediate target points Pm, and the interval between the end point P2 and the intermediate target point Pm closer to the end point P2. Further, the correction according to the second modified example may be applied to the second embodiment.

The specific embodiments of the present disclosure are described in detail above. However, the present disclosure is not limited to the embodiments described above. It is apparent to those skilled in the art that various other embodiments may be employed within the scope of the present disclosure.

For example, according to the respective embodiments and the respective modified examples, the predetermined position of each of the wheels 12FL and 12FR is the lowest point P0 of the wheel, but the predetermined position of each of the wheels 12FL and 12FR may be the position of each of the rotational axes 32FL and 32FR or the middle point between the lowest point P0 and the position of each of the rotational axes 32FL and 32FR.

Moreover, according to the respective embodiments and the respective modified examples, the Cartesian coordinate system 112 is set so as to have the point P1, which is the position of the lowest point P0 when each of the wheels 12FL and 12FR comes into contact with the road surface 22 at the two portions, which are the points P1 and P2, as the origin, the travel direction of the vehicle as the time axis, and the vertical direction as the up/down displacement of the lowest point P0. However, the Cartesian coordinate system 112 may be set to have the position of the lowest point P0 when the predetermined roughness is determined to exist on the road surface 22 ahead of the vehicle 14 as the origin, or may be set to have a middle position between the lowest point P0 when the above-mentioned determination is made and the position of the origin according to the first embodiment and the like as the origin.

Moreover, according to the respective embodiments and the respective modified examples, front sensors corresponding to the rear left and right wheels 12RL and 12RR are not provided. However, front sensors and actuators similar to the front sensors 24FL and 24FR and the actuators 20FL and 20FR may be provided for the rear left and right wheels 12RL and 12RR, and control for correction similar to that according to the respective embodiments and the respective modified examples may be carried out based on detection results of the front sensors and actuators.

Alternatively, actuators similar to the actuators 20FL and 20FR may be provided for the rear left and right wheels 12RL and 12RR, and the same control as that for the front wheels may be carried out for the rear left and right wheels 12RL and 12RR while a value acquired by dividing a wheelbase Lw of the vehicle by the vehicle speed V is used as a delay.

Figure 13:
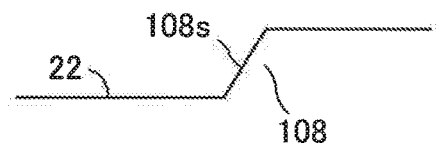
FIG. 13 is a diagram for illustrating other examples of predetermined roughness.
Figure 13:
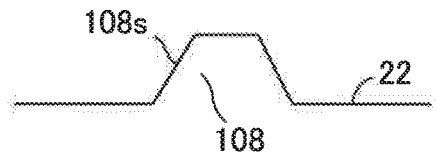
Figure 13:
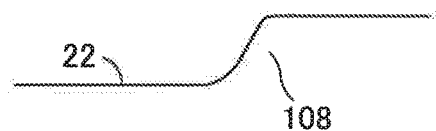

Moreover, according to the respective embodiments and the respective modified examples, the step portion 108, which is the predetermined roughness of the road surface 22, has a step shape, but the predetermined roughness is not limited to the step shape. For example, as illustrated in FIG. 13(A), a side surface 108s of the step portion 108 may be inclined and, as illustrated in FIG. 13(B), the step portion 108 may form a protrusion of the road surface 22. Further, as illustrated in FIG. 13(C), a surface of the step portion 108 may form a curved surface.

What is claimed is:

1. A suspension control device for a vehicle, comprising:
an actuator configured to change an up/down stroke of a suspension for suspending a wheel from a vehicle body;
a prediction device configured to predict an undulation of a road surface ahead of the vehicle; and
a control device configured to estimate a displacement in a vertical direction of the road surface based on a result of the prediction by the prediction device, and control the actuator so that the up/down stroke of the suspension changes depending on a displacement in a vertical direction of the road surface,
wherein the control device is configured to, when an undulation of the road surface that generates a state where the wheel comes into contact with two portions of the road surface in a direction viewed along a rotational axis of the wheel, and in which a leading portion in the travel direction of the vehicle out of the two portions is higher than the other portion is determined to exist on the road surface ahead of the vehicle, control the up/down stroke of the suspension through the control of the actuator so that, when the wheel comes into contact with the two portions, the wheel rolls about the leading portion while maintaining a state of the contact with the leading portion without substantially pressing the leading portion toward the travel direction of the vehicle, and
wherein the control device is configured to set a target trajectory of a predetermined position of the wheel and to control the up/down stroke of the suspension through the control of the actuator so that the predetermined position of the wheel moves along the target trajectory when the wheel comes into contact with the two portions.

2. The suspension control device for a vehicle according to claim 1, wherein the control device is configured to set the target trajectory as a trajectory in a Cartesian coordinate system that has as an origin the predetermined position at a time point set in advance between a time point at which the roughness is determined to exist on the road surface ahead of the vehicle and a time point at which the wheel comes into contact with the two portions of the road surface, the travel direction of the vehicle as a time axis, and the vertical direction as an up/down displacement of the predetermined position.

3. The suspension control device for a vehicle according to claim 2, wherein the control device is configured to set the target trajectory based on a radius of the wheel, a difference in height between the two portions, a distance in the travel direction of the vehicle between the two portions, and a travel speed of the vehicle.

4. The suspension control device for a vehicle according to claim 1, wherein the control device is configured to estimate a displacement in the vertical direction of the road surface after each predetermined period, set, when a plurality of estimated displacements exist between the two portions, at least one intermediate target point on the target trajectory between the two portions, and correct the target trajectory so that the target trajectory is a straight line connecting a start point of the target trajectory and an intermediate target point closest to the start point with each other between the start point and the intermediate target point closest to the start point.

5. The suspension control device for a vehicle according to claim 4, wherein the control device is configured to set a plurality of intermediate target points, and correct the target trajectory so that the target trajectory is a straight line connecting two intermediate target points neighboring each other between the two intermediate target points neighboring each other.

6. The suspension control device for a vehicle according to claim 1, wherein the control device is configured to estimate a displacement in the vertical direction of the road surface after each predetermined period, set, when a plurality of estimated displacements exist between the two portions, at least one intermediate target point on the target trajectory between the two portions, and correct the target trajectory so that the target trajectory is a straight line connecting an intermediate target point closest to an end point of the target trajectory and the end point of the target trajectory with each other between the intermediate target point closest to the end point and the end point.

7. The suspension control device for a vehicle according to claim 6, wherein the control device is configured to set a plurality of intermediate target points, and correct the target trajectory so that the target trajectory is a straight line connecting two intermediate target points neighboring each other between the two intermediate target points neighboring each other.

* * * * *